(12) United States Patent
Kobayashi et al.

(10) Patent No.: US 7,751,386 B2
(45) Date of Patent: Jul. 6, 2010

(54) IP TELEPHONE APPARATUS, ENUM SERVER, IP TELEPHONE SYSTEM AND METHOD FOR DELETING TERMINAL INFORMATION

(75) Inventors: Kazuto Kobayashi, Kanagawa (JP); Akira Miyajima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1260 days.

(21) Appl. No.: 11/183,988

(22) Filed: Jul. 19, 2005

(65) Prior Publication Data

US 2006/0029044 A1 Feb. 9, 2006

(30) Foreign Application Priority Data

Aug. 6, 2004 (JP) ............................ P2004-231154
Mar. 24, 2005 (JP) ............................ P2005-085871

(51) Int. Cl.
H04L 12/66 (2006.01)

(52) U.S. Cl. ...................... 370/352; 370/260; 370/261

(58) Field of Classification Search ................. 370/352, 370/260, 261
See application file for complete search history.

(56) References Cited

U.S. PATENT DOCUMENTS

| | | | |
|---|---|---|---|
| 7,233,589 B2 | 6/2007 | Tanigawa et al. | |
| 7,269,162 B1* | 9/2007 | Turner | .................. 370/352 |
| 7,508,822 B2 | 3/2009 | Tanigawa et al. | |
| 2002/0075304 A1 | 6/2002 | Thompson | |
| 2002/0128047 A1* | 9/2002 | Gates | ................. 455/566 |
| 2003/0074461 A1* | 4/2003 | Kang et al. | ................. 709/230 |
| 2004/0001480 A1 | 1/2004 | Tanigawa et al. | |
| 2004/0243596 A1* | 12/2004 | Lillqvist et al. | ............ 707/100 |
| 2004/0253932 A1* | 12/2004 | Gartrell | .................... 455/90.3 |
| 2005/0182781 A1* | 8/2005 | Bouvet | ........................ 707/102 |
| 2008/0069315 A1 | 3/2008 | Tanigawa et al. | |

FOREIGN PATENT DOCUMENTS

| | | |
|---|---|---|
| FR | 2841072 | 12/2003 |
| JP | 6-104986 | 4/1994 |
| JP | 2004-013303 | 1/2004 |
| JP | 2004-120124 | 4/2004 |
| JP | 2004-187034 | 7/2004 |

(Continued)

OTHER PUBLICATIONS

ETSI, "ENUM Administration in Europe," ETSI Standards, ETSI TS 102 051 V1.1.1, Technical Specification, European Telecommunications Standards Institute, Sophia-Antipo, France, Jul. 2002, XP002311971.

(Continued)

*Primary Examiner*—Quynh H Nguyen
(74) *Attorney, Agent, or Firm*—Greenblum & Bernstein, P.L.C.

(57) ABSTRACT

A CPU in an IP telephone apparatus automatically controls to transmit, from a network I/F to an ENUM server, a request for deleting a NAPTR record when an absent key is pressed. The CPU regularly transmits, from the network I/F to the ENUM server, an inquiry for a NAPTR record of another IP telephone apparatus. When the CPU receives, from the ENUM server via the network I/F, a response indicating that the NAPTR record of another IP telephone apparatus has been deleted, in response to the inquiry, the CPU turns OFF a lamp indicating that the user is available.

9 Claims, 9 Drawing Sheets

FOREIGN PATENT DOCUMENTS

| | | |
|---|---|---|
| JP | 2004-193984 | 7/2004 |
| WO | 02/50722 | 6/2002 |
| WO | 03/107627 | 12/2003 |
| WO | 2004/019592 | 3/2004 |
| WO | 2004/059946 | 7/2004 |
| WO | 2004/062299 | 7/2004 |

OTHER PUBLICATIONS

A publication issued by ENUM trial Japan "ENUM Trial Japan First Report", May 2004, together with a partial English translation of the same.

U.S. Appl. No. 11/082,795 to Kaizawa et al., filed Mar. 18, 2005.
U.S. Appl. No. 11/082,796 to Kaizawa et al., filed Mar. 18, 2005.
U.S. Appl. No. 11/150,111 to Kobayashi et al., filed Jun. 13, 2005.
U.S. Appl. No. 11/150,117 to Kobayashi et al., filed Jun. 13, 2005.
U.S. Appl. No. 11/150,119 to Kobayashi et al., filed Jun. 13, 2005.
U.S. Appl. No. 11/166,236 to Kobayashi et al., filed Jun. 27, 2005.
U.S. Appl. No. 11/183,955 to Kobayashi et al., filed Jul. 19, 2005.
U.S. Appl. No. 11/183,963 to Kobayashi et al., filed Jul. 19, 2005.
U.S. Appl. No. 11/184,899 to Kobayashi et al., filed Jul. 20, 2005.
U.S. Appl. No. 11/195,817 to Kobayashi et al., filed Aug. 3, 2005.

* cited by examiner

Fig.9

ENUM Database

| ENUM Domain Name | | Order | Preference | Flags | Service | URI Scheme |
|---|---|---|---|---|---|---|
| 0.0.0.0.0.0.0.1.3.1.8.e164.arpa | IN NAPTR | 100 | 10 | "u" | "E2U+sip" | "!^.*$!sip:81310000000@tokyo.sip.jp!" |
| | IN NAPTR | 100 | 10 | "u" | "E2U+message:mailto" | "!^.*$!mailto:8130000000@tokyo.mail.com!" |
| | IN NAPTR | 100 | 10 | "u" | "E2U+http" | "!^.*$!http://www.tokyo.sip.com/user81310000000.html!" |
| 1.0.0.0.0.0.0.1.3.1.8.e164.arpa | IN NAPTR | 100 | 10 | "u" | "E2U+sip" | "!^.*$!sip:81310000001@tokyo.sip.jp!" |
| | IN NAPTR | 100 | 10 | "u" | "E2U+message:mailto" | "!^.*$!mailto:8130000001@tokyo.mail.com!" |
| | IN NAPTR | 100 | 10 | "u" | "E2U+http" | "!^.*$!http://www.tokyo.sip.com/user81310000001.html!" |

NAPTR resource record

IP TELEPHONE APPARATUS, ENUM SERVER, IP TELEPHONE SYSTEM AND METHOD FOR DELETING TERMINAL INFORMATION

BACKGROUND OF THE INVENTION

1. Field of the Invention

The present invention relates to an IP telephone apparatus, an ENUM server, an IP telephone system, and a method for deleting terminal information. The present invention particularly relates to an IP telephone apparatus, an ENUM server and an IP telephone system that delete a NAPTR resource record from the ENUM server, and to a method for deleting a NAPTR resource record from the ENUM server.

2. Description of Related Art

Recently the Internet has been rapidly popularized. An IP telephone system has become the center of attention since a long distance communication can be performed at lower cost by using IP telephone apparatuses and since the IP telephone system enables users who have applied for the IP telephone system to communicate with each other through IP telephone apparatuses for free of charge. Additionally, an "ENUM (Telephone Number Mapping)" protocol is acknowledged as a protocol that associates the services using the Internet with the telephone numbers or associates the resources on the Internet with the telephone numbers. This ENUM protocol is specified in RFC2916 (Publication 1), which is being studied at the IETF (Internet Engineering Task Force) and the ITU-T (International Telecommunication Union-Telecommunication Standardization Sector).

The "ENUM" protocol has a function that converts a telephone number into a number corresponding to the E.164 system specified by the ITU-T and searches an IP address or a URI (Uniform Resource Identifier) using the mechanism of the DNS (Domain Name System) based on the converted telephone number.

An ENUM system is also being studied so that a service is provided using the "ENUM" protocol. In this ENUM system, an end user of the IP terminal apparatus such as, for example, an IP telephone apparatus which uses the ENUM system can select various functions (URI, the services using the URI {including telephone communication, e-mail and access to the database}). The end user, thus, needs to set the selected function into a "NAPTR (the Naming Authority Pointer)" resource record and to store the set NAPTR resource record in the ENUM system.

Additionally, the end user needs to instruct the ENUM server to transmit a request for the deletion when the registered NAPTR resource record is deleted.

[Publication 1] "ENUM Trial Japan First Report" ENUM Trial Japan, May 2004

However, the end user of the conventional IP terminal apparatus such as an IP telephone apparatus using the "ENUM" protocol was required to instruct the ENUM server to transmit a request for the deletion when the NAPTR resource record was deleted. It was problematic in that the operation of deleting the NAPTR resource record became complex for the end users since the end users themselves had to transmit the request for the deletion.

SUMMARY OF THE INVENTION

The present invention is provided to address the above-described problem. The objective of the present invention is to provide an IP telephone apparatus, an ENUM server and an IP telephone system that delete a NAPTR record from the ENUM server corresponding to the operation of a predetermined indication key, and to provide a method for deleting the NAPTR record from the ENUM server. The predetermined key is provided on the IP telephone apparatus and configured to transmit a request for deleting the NAPTR record.

This invention relates to an IP telephone apparatus connected to an ENUM server via an IP network. The IP telephone apparatus includes an indicator that transmits a request for deleting information regarding the terminal apparatus stored in the ENUM server. The IP telephone apparatus also includes a deletion request processor that transmits, to the ENUM server, a request for deleting information regarding the terminal apparatus stored in the ENUM server corresponding to the request from the indicator.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 9 illustrates a drawing describing an example of a NAPTR record of the ENUM database in the ENUM server according to the embodiment of the present invention.

DETAILED DESCRIPTION OF PREFERRED EMBODIMENTS

The embodiments of the present invention are explained in the following, in reference to the above-described drawings.

Figure 1:
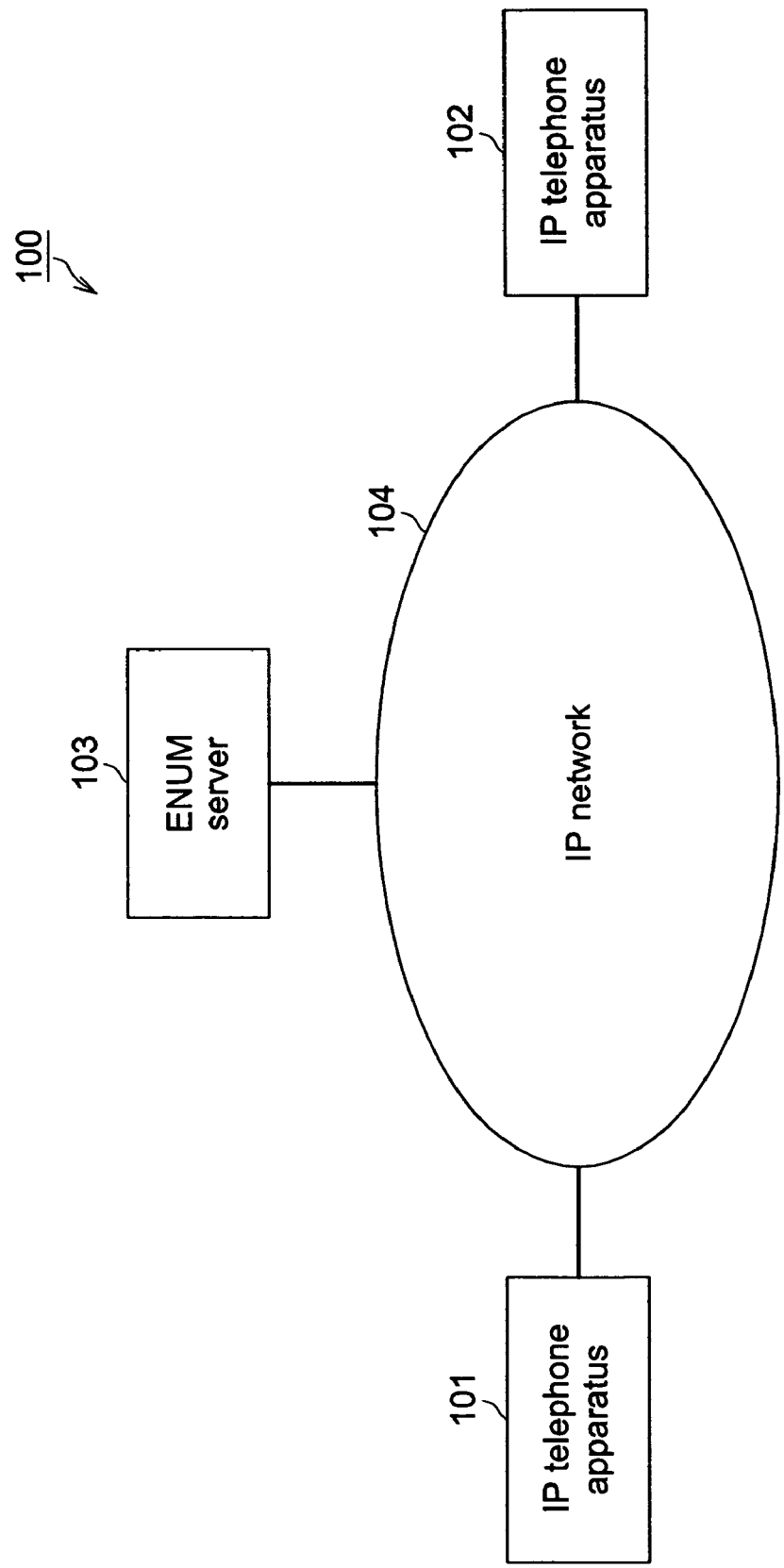
FIG. 1 illustrates a network configuration to which an IP telephone system according to an embodiment of the present invention applies.

FIG. 1 is a diagram illustrating a network configuration of the IP telephone system according to the embodiment of the present invention. In FIG. 1, in IP telephone system 100, IP telephone apparatus 101, IP telephone apparatus 102, and ENUM server 103 are mutually connected via IP network 104. Also, an IP telephone system is not limited to the configuration described in FIG. 1 and can be configured to connect to three or more IP telephones.

IP telephone apparatus 101 (102) has functions that enable voice communication with another IP telephone apparatus via IP network 104.

ENUM (Telephone Number Mapping) server 103 has a database that stores a NAPTR (The Naming Authority Pointer) resource record (hereafter referred to as NAPTR record). ENUM server 103 returns, to IP telephone apparatus 101 (102), the NAPTR record stored in the database, in response to the request of IP telephone apparatus 101 (102).

Figure 2:
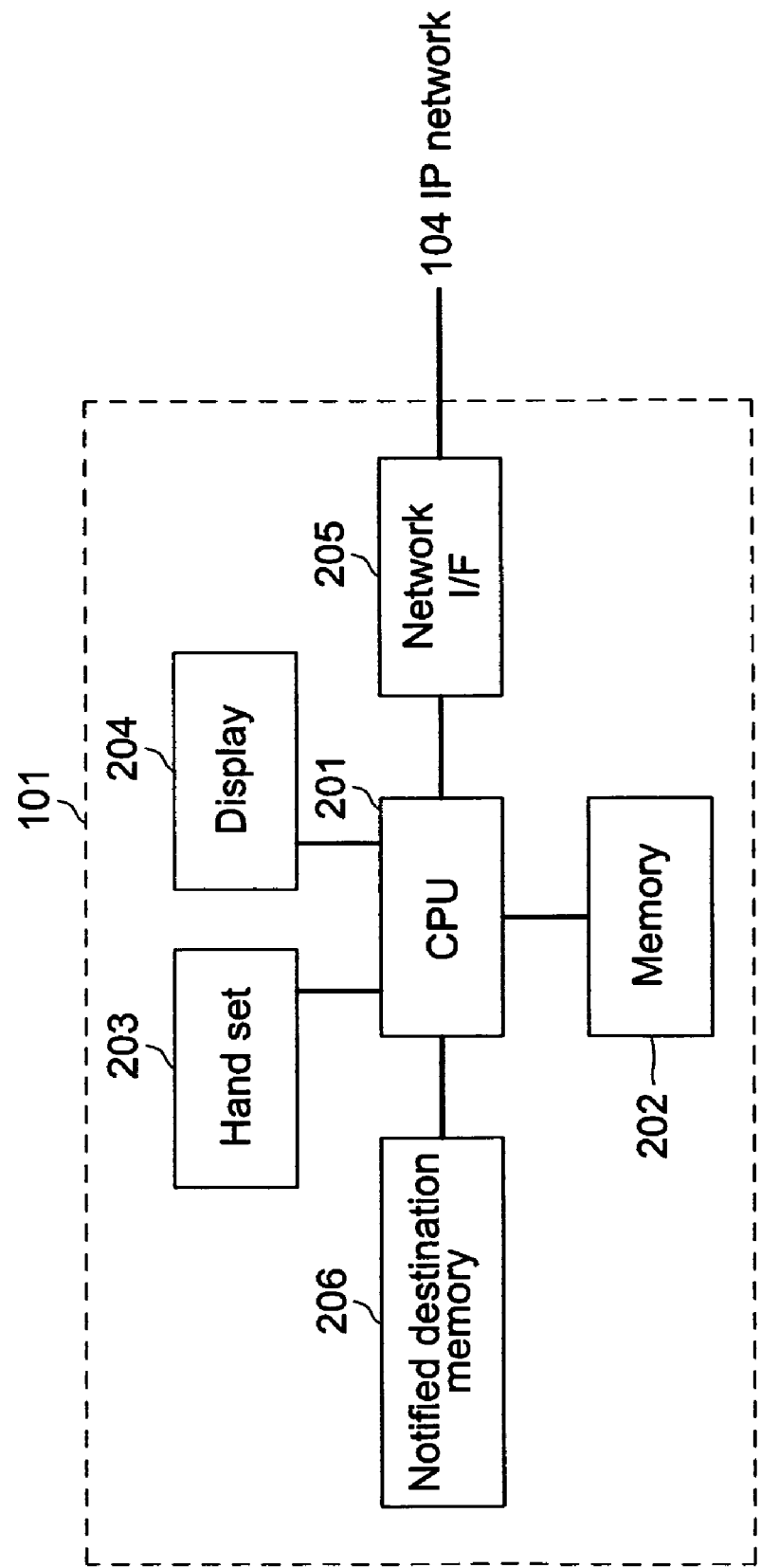
FIG. 2 illustrates a block diagram describing a configuration of an IP telephone apparatus according to the embodiment of the present invention.

FIG. 2 is a block diagram illustrating a configuration of IP telephone apparatus 101 according to the embodiment of the present invention. IP telephone apparatus 102 has the same configuration as IP telephone apparatus 101.

In FIG. 2, IP telephone apparatus 101 is configured mainly with CPU 201, memory 202, handset 203, display 204 and network-interface (henceforth referred to as network I/F) 205 and notified destination memory 206.

CPU (Central Processing Unit) 201 controls all the operations to perform voice communication with another IP telephone apparatus 102 via IP network 104 based on the program for controlling voice communication. The program is stored in memory 202. CPU 201, therefore, controls a call with the destination terminal, according to a call control protocol, such as SIP (Session Initiation Protocol) and H.323. CPU 201 also transmits necessary requests to display 204 and network I/F 205.

In addition, CPU 201 controls the transmission of the message "Request the NAPTR record" to ENUM server 103 and the reception of the message "Respond indicating the deletion of the NAPTR record" from ENUM server 103. The message "Request the NAPTR record" is transmitted for requesting a NAPTR record corresponding to a destination terminal. The message "Respond indicating the deletion of the NAPTR record" is transmitted in response to the message "Request the NAPTR record". CPU 201 also controls to automatically transmit, from network I/F 205 to ENUM server 103, a request for deleting the NAPTR record when absent key 303, which will be described later, is pressed. An "absent key" is provided on IP telephone apparatus 101. The "absent key" has a function to indicate that the user is not available when the user is out or is not at his desk. When the "absent key" is pressed, the NAPTR record of IP telephone apparatus 101 is deleted from the ENUM server. The user of IP telephone apparatus 101 can indicate to the user of another IP telephone apparatus that the user is not available by turning off the display lamp of the another IP telephone apparatus, the display lamp indicating that the user is available. The "absent key" can be combined with the conventional "answering machine key", which is contained in the answering machine telephone function. In this case, when the "absent key" is pressed, IP telephone apparatus 101 deletes the NAPTR record and turns off the display lamp of another IP telephone apparatus, the display lamp indicating that the user is available. At the same time, IP telephone apparatus 101 performs the same process in order to set a conventional recording mode.

In addition, CPU 201 regularly transmits, from network I/F 205 to ENUM server 103, a request for the NAPTR record of IP telephone apparatus 102. Upon receiving, from ENUM server 103 via network I/F 205, a response indicating the deletion of the NAPTR record of IP telephone apparatus 102 corresponding to the request, CPU 201 turns off display lamp 305 indicating that the user is available. Display lamp 305 will be described later.

Also, upon regularly receiving the request for the NAPTR record of IP telephone apparatus 101 transmitted from IP telephone apparatus 102 via network I/F 205 and when the NAPTR record of IP telephone apparatus 101 has been deleted, CPU 201 returns, to IP telephone apparatus 102 via network I/F 205, a response indicating the deletion of the NAPTR record of IP telephone apparatus 101. CPU 201 also functions as a deletion request processor.

Memory 202 has a function as a ROM (Read Only Memory) that stores a program for controlling voice communication and so on that is conducted by CPU 201. Memory 202 also has a function as a RAM (Random Access Memory), which is used as a work-memory when CPU 201 performs a program.

Handset 203 outputs, to CPU 201, an off-hook signal or an on-hook signal, according to the off-hook operation or an on-hook operation performed by the user. Handset 203 also contains a microphone and a speaker. Handset 203 converts the user's transmitted voice into the transmitted voice signal and outputs, to CPU 201, the converted voice signal when starting voice communication with the destination terminal. At the same time, handset 203 inputs the received voice signal from CPU 201 and outputs the received voice signal as received voice via the speaker.

Display 204 is configured with a liquid crystal panel and so forth. Display 204 displays the current status of IP telephone apparatus 101 as well as the name, the address, the telephone number, etc. of the source IP telephone apparatus input by CPU 201.

Network I/F 205 is an interface for IP network 104 that is connected to IP telephone apparatus 101. Network I/F 205 transmits, to ENUM server 103, a request for the deletion upon the control of CPU 201 and receives a response indicating the deletion of the NAPTR record of IP telephone apparatus 102. Network I/F 205 further functions as a transmitter and a receiver.

Notified destination memory 206 stores user information of IP telephone apparatus 102, which is the call destination. A result of the deletion process is notified to IP telephone apparatus 102. Notified destination memory 206 also functions as a memory.

Figure 3:
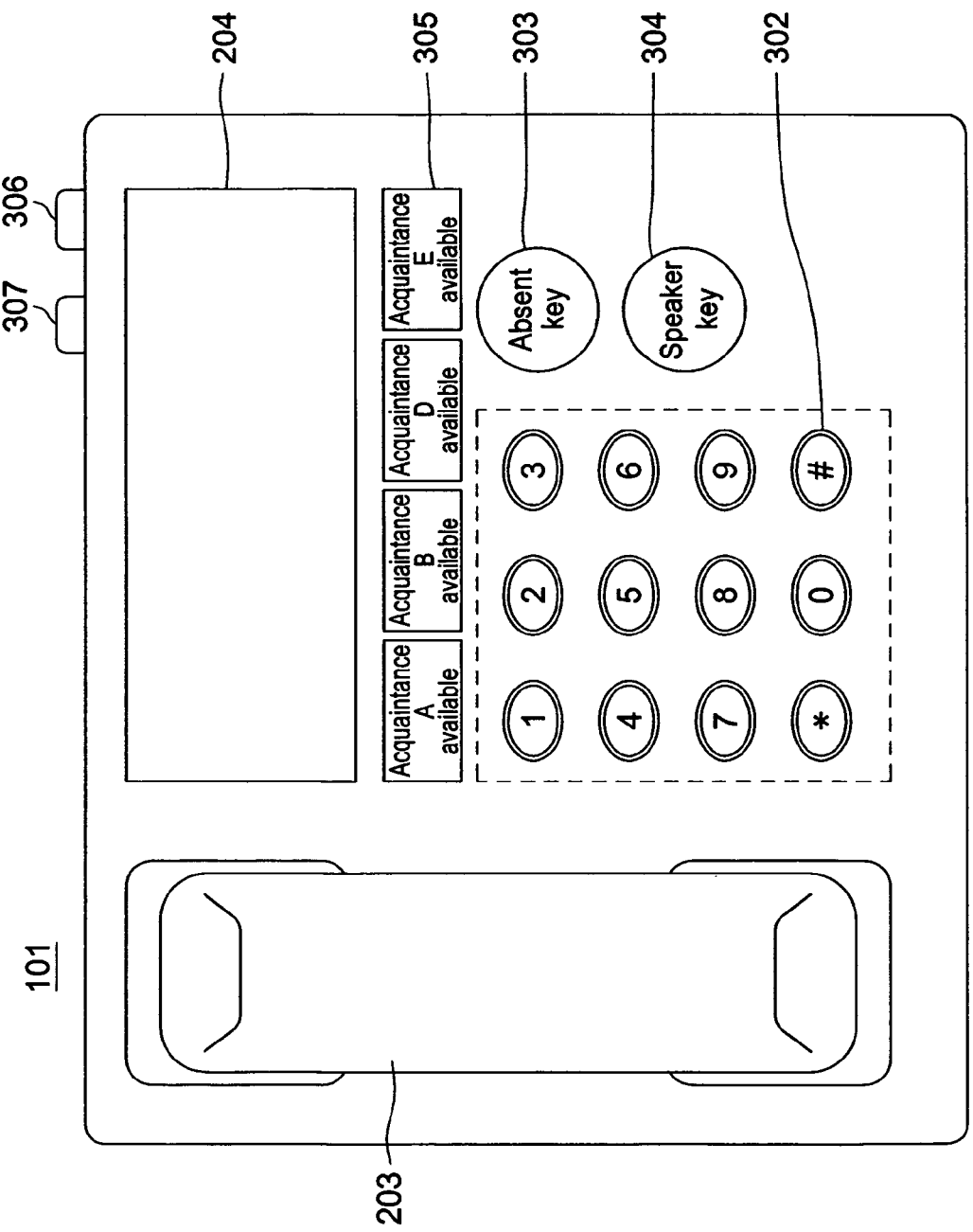
FIG. 3 illustrates a front view describing the appearance of the IP telephone apparatus shown in FIG. 2.

FIG. 3 is a front view illustrating the appearance of IP telephone apparatus 101 according to the present embodiment. IP telephone apparatus 102 has the same configuration.

In FIG. 3, IP telephone apparatus 101 includes a microphone, handset 203, ten-key pad 302, absent key 303, speaker key 304 and display lamp 305, which indicates that the user is available. The microphone receives a user's voice. Handset 203 has a speaker that outputs the received voice. Ten-key pad 302 inputs telephone numbers and so on. Absent key 303 indicates that the user of the IP telephone apparatus is not available. Absent key 303 can switch on and off the answering machine telephone function. Speaker key 304 switches output of the voice from the speaker of handset 203 to an external speaker. Display lamp 305 shows that the user of another IP telephone apparatus is available. On the side area, IP telephone apparatus 101 contains LAN interface (LAN I/F) 306 and public line interface (public line I/F) 307. The LAN interface is connected to IP network 104. The public line interface is connected to the public line network. Absent key 303 functions as an indicator.

Above display lamp 305 that indicates that the user is available, display 204 is provided. Display 204 is configured with a liquid crystal panel and so on. Display 204 displays the telephone number of the source IP telephone apparatus or the name, the address and so on registered in the telephone directory corresponding to the telephone number of the source IP telephone apparatus, based on the NAPTR record that is received from ENUM server 103. Also, display lamp 305 is able to display, for up to four users of the IP telephone apparatuses, that the user is available. FIG. 3 illustrates an instance where the display lamps are configured to display information regarding acquaintance A, acquaintance B, acquaintance D and acquaintance E. Display lamp 305 indicating that the user is available also functions as a display. Further, display lamp 305 indicating that the user is available corresponding to the IP telephone apparatus of acquaintance A is lighted, for example, when the IP telephone apparatus of acquaintance A is turned ON, when the key provided on the IP telephone apparatus of acquaintance A indicating that the user is available is pressed, or when a message indicating that the user of the IP telephone apparatus of acquaintance A is available is received from the IP telephone apparatus of acquaintance A. When the four display lamps of acquaintance A, acquaintance B, acquaintance D and acquaintance E indicating that the user is available are lighted, it indicates that a message that the user of the IP telephone apparatus is available has been received from each of the four IP telephone apparatuses. Additionally, memory 202 of the IP telephone apparatus stores the identification information of the lamp, the names of acquaintances (for example, A) and the telephone numbers corresponding to each other. The identification information of the lamp indicates, for example, which lamp of four display lamps 305 indicating that the user is available and provided on the IP telephone apparatuses applies to an individual call destination (for example, lamps from left to right in order are specified as lamp 1, lamp 2, lamp 3 and lamp 4). Therefore, by referring to memory 202, the IP telephone apparatus can determine to which telephone number a request for the NAPTR record of the IP telephone apparatus should be transmitted and which display lamp indicating that the user is available should be turned off upon receiving the response indicating that the NAPTR record of the IP telephone apparatus has been deleted.

Figure 4:
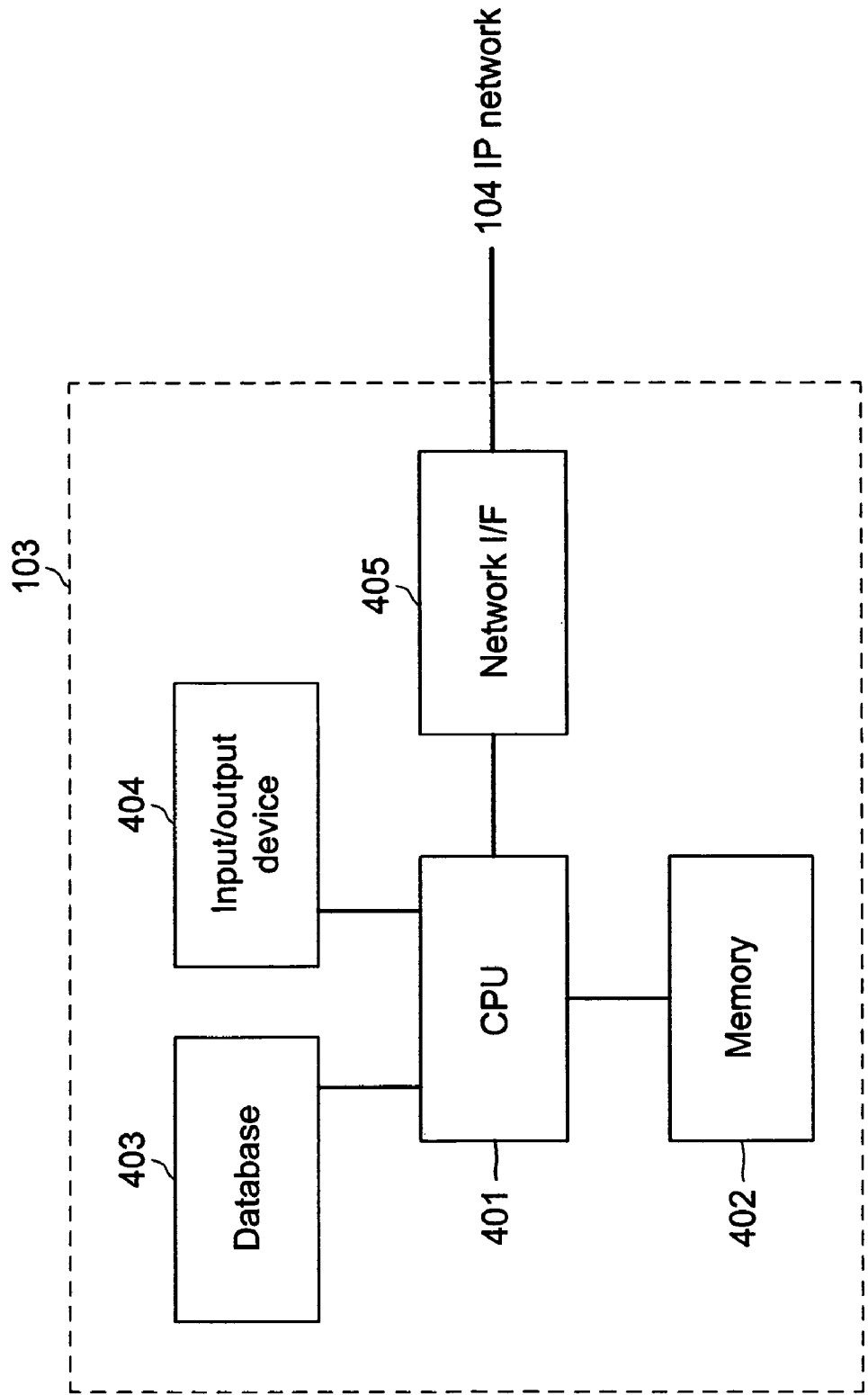
FIG. 4 illustrates a block diagram describing a configuration of an ENUM server according to the embodiment of the present invention.

FIG. 4 is a block diagram illustrating the configuration of ENUM server 103 according to the embodiment of the present invention. In FIG. 4, ENUM server 103 is configured mainly with CPU 401, memory 402, user database 403, input/output device 404, and network I/F 405.

CPU 401 controls the entire operation of ENUM server 103 based on the control program stored in memory 402. Also, upon receiving, for example, from IP telephone apparatus 101, a request for the registration of a NAPTR record "Register", CPU 401 starts an application software such as "Nsupdate" and registers the NAPTR record of IP telephone apparatus 101 in database 403, which will be described later. Then, CPU 401 returns, from network I/F 405 to IP telephone apparatus 101, a signal indicating completion of the registration.

Also, for example, when a request for deleting a NAPTR record of IP telephone apparatus 101 is received from IP telephone apparatus 101, CPU 401 starts an application software such as "Nsupdate" and deletes the NAPTR record of IP telephone apparatus 101 stored in database 403, which will be described later. Then, CPU 401 returns, from network I/F 405 to IP telephone apparatus 101, a signal indicating that the NAPTR record of IP telephone apparatus 101 has been deleted. CPU 401 functions as a deletion processor.

Memory 402 has a function as a ROM that stores a control program and so on that is performed by CPU 401. Memory 402 also has a function as a RAM that is used as a work-memory when CPU 401 performs a program.

Database 403 is a database that registers the NAPTR record of IP telephone apparatus 101 and IP telephone apparatus 102. Input/output device 404 is configured with an input device and with an output device. The input device includes a keyboard that is used when ENUM server 103 is maintained. The output device includes a display that displays the maintenance information.

Network I/F 405 is an interface to IP network 104 that is connected with ENUM server 103. Network I/F 405 transmits, to IP telephone apparatus 101 and IP telephone apparatus 102, a message that the registration operation and/or deletion operation have/has been performed by the control of CPU 401. Further, network I/F 405 functions as a transmitter.

Next, the operation is described, in IP telephone system 100 of FIG. 1, from when IP telephone apparatus 101 transmits, to ENUM server 103, a request for the deletion of a NAPTR record to when IP telephone apparatus 101 transmits, to IP telephone apparatus 102, a response indicating the deletion of the NAPTR record. The description refers to the sequence diagram in FIG. 5.

Figure 5:
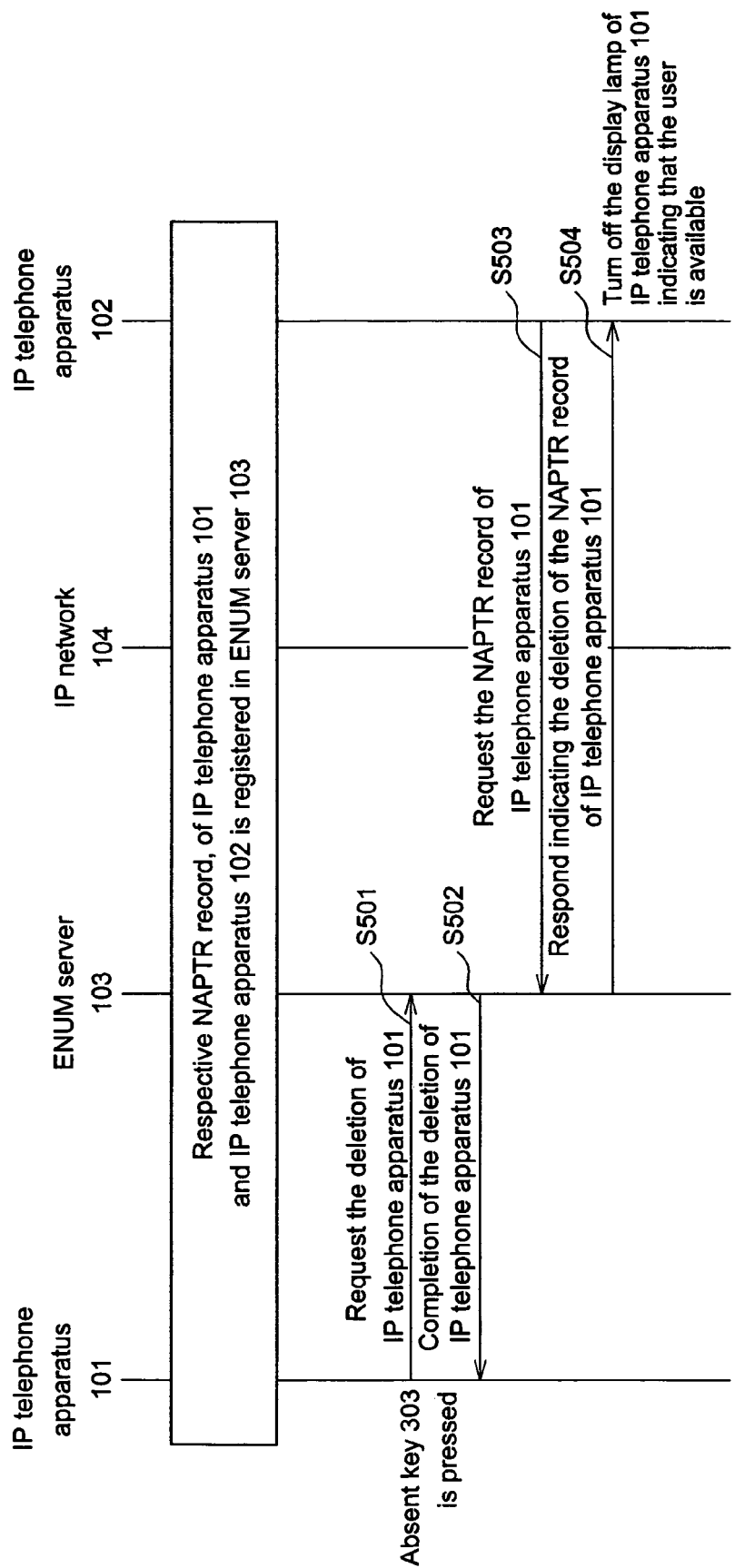
FIG. 5 illustrates a sequence diagram describing the IP telephone system according to the embodiment of the present invention; from when the IP telephone apparatus transmits, to the ENUM server, a request for deleting a NAPTR record, to when the IP telephone apparatus notifies another telephone apparatus that the NAPTR record of the IP telephone apparatus has been deleted from the ENUM server.

As a premise of describing the operation of FIG. 5, ENUM server 103 previously stores, into database 403, the NAPTR records of IP telephone apparatus 101 and IP telephone apparatus 102 shown in FIG. 9. IP telephone apparatus 102 is already notified that the user of IP telephone apparatus 101 is available. Thus, display lamp 305 of IP telephone apparatus 102 indicating that the user of IP telephone apparatus 101 is available is lighted. In FIG. 9, the top line of the ENUM domain name is the NAPTR records of IP telephone 101, and the bottom line of the ENUM domain name is the NAPTR record of IP telephone 102.

When the user of IP telephone apparatus 101 presses absent key 303 since the user is going to be unavailable, CPU 201 recognizes an ON signal of absent key 303 and transmits, from network I/F 205 to ENUM server 103, a message "Request the deletion of IP telephone apparatus 101" in order to transmit a request for deleting the NAPTR record of the terminal apparatus from ENUM server 103 (step S501).

Next, upon receiving, from IP telephone apparatus 101 via network I/F 405, the message "Request the deletion of IP telephone apparatus 101", CPU 401 in ENUM server 103 starts an application software such as "Nsupdate" and deletes the NAPTR record of IP telephone apparatus 101 stored in database 403 in FIG. 9. Then, CPU 401 returns, from network I/F 405 to IP telephone apparatus 101, a message "Completion of the deletion of IP telephone apparatus 101" (step S502). According to the embodiment, the message "Completion of the deletion of IP telephone apparatus 101" is an original message that is designed for this process.

Next, when the NAPTR record of IP telephone apparatus 101 is requested by IP telephone apparatus 102, IP telephone apparatus 102 reads the telephone number of IP telephone apparatus 101 from memory 202 and regularly transmits, to ENUM server 103, a message "Request the NAPTR record of IP telephone apparatus 101" using the polling function (step S503). Additionally, when four people are registered in memory 202 as call destinations and when the NAPTR records of the IP telephone apparatuses are requested, IP telephone apparatus 102 is configured to regularly transmit a message "Request the NAPTR record" to each of the IP telephone apparatuses. Upon regularly receiving the message "Request the NAPTR record of IP telephone apparatus 101" regularly transmitted from IP telephone apparatus 102 via network I/F 405, since in this case the NAPTR record of IP telephone apparatus 101 has been deleted, CPU 401 in ENUM server 103 returns, from network I/F 405 to IP telephone apparatus 102, a message "Respond indicating the deletion of the NAPTR record of IP telephone apparatus 101" (step S504). On the other hand, when the NAPTR record of the IP telephone apparatus has not been deleted, the corresponding NAPTR record is returned to the IP telephone apparatus.

Next, upon receiving, from ENUM server 103 via network I/F 205, the message "Respond indicating the deletion of the NAPTR record of IP telephone apparatus 101", CPU 201 in IP telephone apparatus 102 recognizes that the NAPTR record of IP telephone apparatus 101 has been deleted and turns off display lamp 305 indicating that the user is available. More specifically, CPU 201 in IP telephone apparatus 102 searches, from memory 202, the telephone number of IP telephone apparatus 101 since the response indicating the deletion of the NAPTR record of IP telephone apparatus 101 has been received. Then, CPU 201 obtains the identification information of the corresponding lamp (for example, lamp 1) and turns off the display lamp corresponding to lamp 1. Thus, the user of IP telephone apparatus 102 can confirm that the user of IP telephone apparatus 101 is not available.

Figure 6:
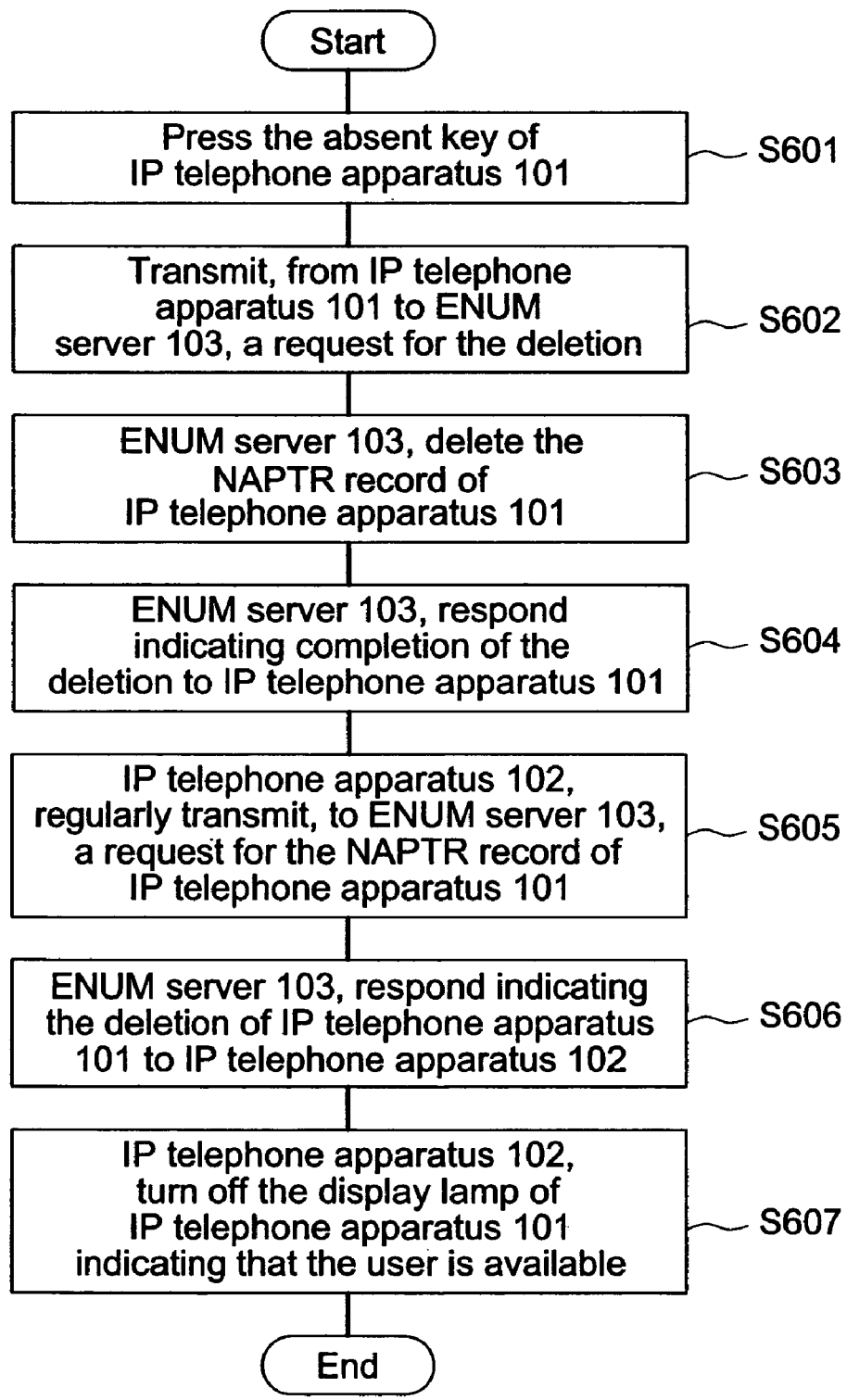
FIG. 6 illustrates a flowchart describing the operation of the IP telephone system according to the sequence diagram shown in FIG. 5.

Next, the following describes the operation of IP telephone apparatus 101, ENUM server 103 and IP telephone apparatus 102, according to the sequence diagram shown in FIG. 5 with reference to the flowchart illustrated in FIG. 6. In database 403 in ENUM server 103, the respective NAPTR record of IP telephone apparatus 101 and IP telephone apparatus 102 shown in FIG. 9 is previously stored.

When the user of IP telephone apparatus 101 presses absent key 303 since the user is going to be unavailable (step S601), CPU 201 in IP telephone apparatus 101 recognizes an ON signal of absent key 303 and transmits, to ENUM server 103, a message "Request for the deletion of IP telephone apparatus 101" in order to transmit a request for deleting the NAPTR record of the terminal apparatus from ENUM server 103 (step S602).

Next, upon receiving the message "Request the deletion of IP telephone apparatus 101" from IP telephone apparatus 101, ENUM server 103 starts an application software such as "Nsupdate" and deletes the NAPTR record of IP telephone apparatus 101 stored in database 403 (step S603). Then, ENUM server 103 returns, from network I/F 405 to IP telephone apparatus 101, a message "Completion of the deletion of IP telephone apparatus 101" (step S604).

Next, IP telephone apparatus 102 regularly transmits, to ENUM server 103, a message "Request the NAPTR record of IP telephone apparatus 101" using the polling function (step S605). Upon regularly receiving the message "Request the NAPTR record of IP telephone apparatus 101" transmitted from IP telephone apparatus 102 via network I/F 405, since in the case the NAPTR record of IP telephone apparatus 101 has been deleted, CPU 401 in ENUM server 103 returns, from network I/F 405 to IP telephone apparatus 102, a message "Respond indicating the deletion of the NAPTR record of IP telephone apparatus 101" (step S606).

Next, upon receiving, from ENUM server 103 via network I/F 205, the message "Respond indicating the deletion of the NAPTR record of IP telephone apparatus 101", CPU 201 in IP telephone apparatus 102 recognizes that the NAPTR record of IP telephone apparatus 101 has been deleted and turns off display lamp 305 indicating that the user is available (step S607).

For example, in FIG. 3, when IP telephone apparatus 101 is "acquaintance A", the "acquaintance A is available" lamp is turned off in order to notify that acquaintance A is not available.

In the above-described sequence diagram according to FIG. 5 and the flowchart according to FIG. 6, IP telephone apparatus 102 regularly transmits, to ENUM server 103, the message "Request the NAPTR record of IP telephone apparatus 101" using the polling function. However, the present invention is not limited to this embodiment. For example, ENUM server 103 can be configured to transmit, to IP telephone apparatus 102, a message indicating that the NAPTR record of IP telephone apparatus 101 has been deleted.

Figure 7:
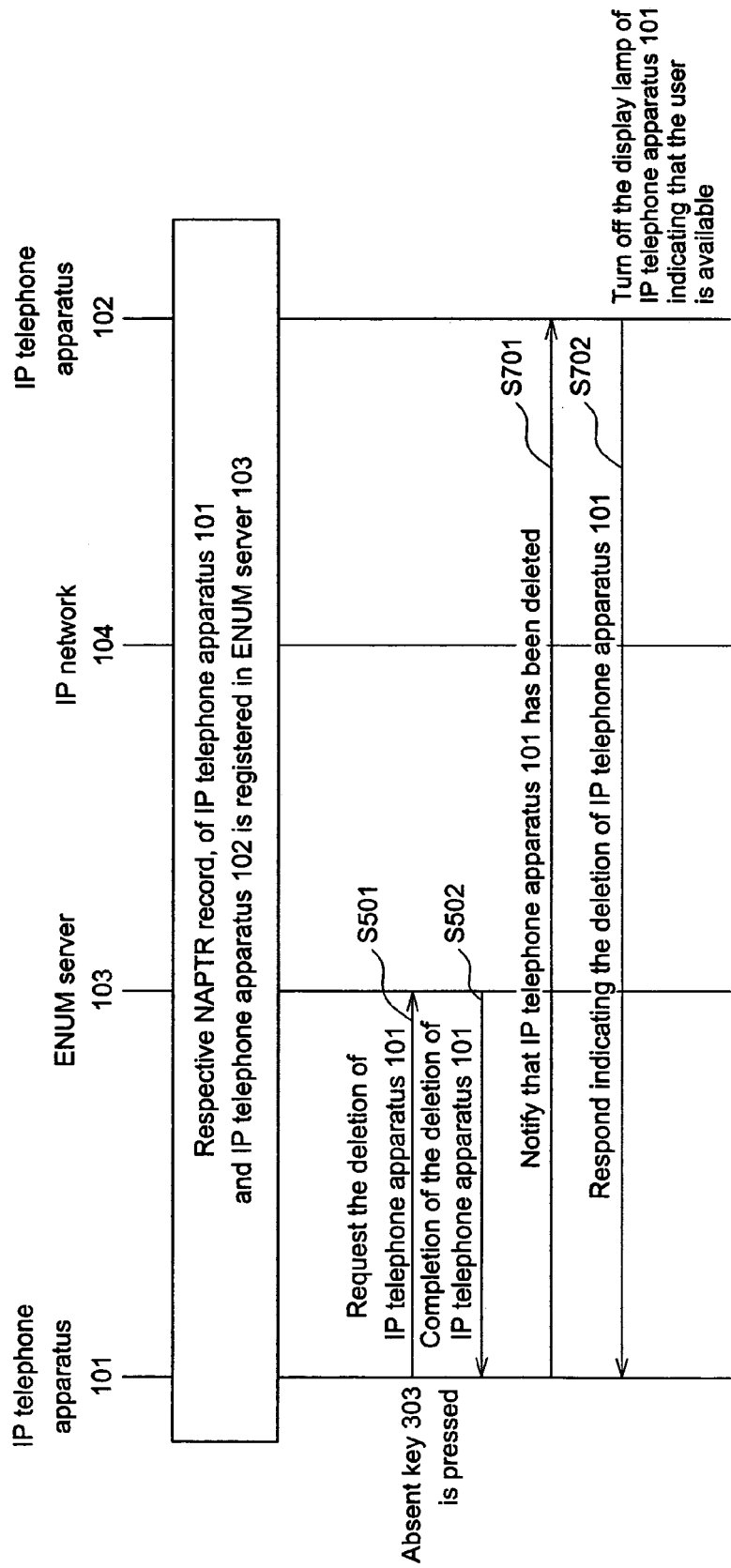
FIG. 7 illustrates a sequence diagram describing the operation, part of which is changed from the operation shown in FIG. 5.
Figure 8:
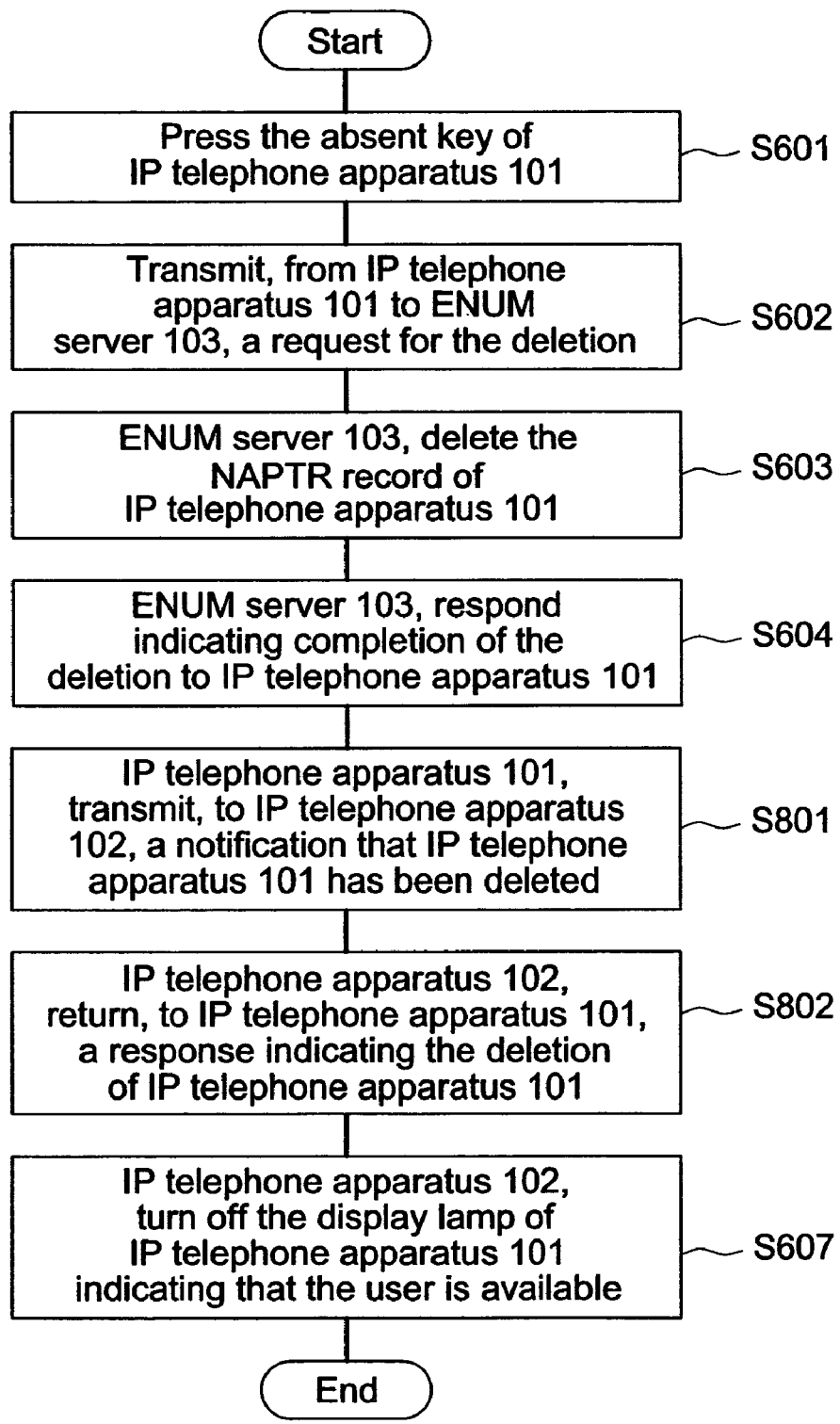
FIG. 8 illustrates a flowchart describing the operation of the IP telephone system according to the sequence diagram shown in FIG. 7.

The following describes a case where ENUM server 103 can be configured to transmit, to IP telephone apparatus 102, a message indicating that the NAPTR record of IP telephone apparatus 101 has been deleted with reference to the sequence diagram in FIG. 7 and the flowchart in FIG. 8.

IP telephone apparatus 101 and IP telephone apparatus 102 perform the same registration operation and deletion operation according to the sequence diagram in FIG. 7 as the registration operation and deletion operation up to step S501 and step S502 shown in FIG. 5. Thus, the different operation is indicated as step S701 and step S702, and the description of the sequence diagram is limited to this operation.

Upon receiving, from ENUM server 103, a message "Completion of the deletion of IP telephone apparatus 101" (step S502), CPU 201 in IP telephone apparatus 101 refers to a call destination stored in notified destination memory 206 and transmits, to IP telephone apparatus 102, a message "Notify that the NAPTR record of IP telephone apparatus 101 has been deleted" (step S701). In this case, the message "Notify that the NAPTR record of IP telephone apparatus 101 has been deleted" is an original message that is designed for this process. At the same time, when a plurality of destinations are specified as call destinations, CPU 201 in IP telephone apparatus 101 transmits a message "Notify that the NAPTR record of IP telephone apparatus 101 has been deleted" to each of the call destinations. It is desirable that the users themselves can register the call destination IP telephone apparatus.

Upon receiving, from IP telephone apparatus 101, the message "Notify that the NAPTR record of IP telephone apparatus 101 has been deleted," CPU 201 in IP telephone apparatus 102 returns, to IP telephone apparatus 101, the message "Respond indicating the deletion of IP telephone apparatus 101" (step S702). Then, CPU 201 recognizes that the NAPTR record of IP telephone apparatus 101 has been deleted and turns off display lamp 305 indicating that the user is available. In this case, the message "Respond indicating the deletion of IP telephone apparatus 101" is an original message that is designed for this process.

Likewise, in the flowchart shown in FIG. 8, only step S801 and step S802 are different. In step S801, upon receiving, from ENUM server 103, a message "Completion of the deletion of IP telephone apparatus 101", CPU 201 in IP telephone apparatus 101 refers to a call destination stored in notified destination memory 206 and transmits, to IP telephone apparatus 102, a message "Notify that the NAPTR record of IP telephone apparatus 101 has been deleted".

Next, in step S802, upon receiving, from IP telephone apparatus 101, a message "Notify the NAPTR record of IP telephone apparatus 101 has been deleted", CPU 201 in IP telephone apparatus 102 returns, to IP telephone apparatus 101, a message "Respond indicating the deletion of the NAPTR record of IP telephone apparatus 101".

As described above, in IP telephone system 100 according to the embodiment of the present invention, when absent key 303 provided on IP telephone apparatus 101 is pressed, a request for deleting the NAPTR record is transmitted to ENUM server 103 and a process of deleting the NAPTR record of IP telephone apparatus 101 is performed.

After the process of deleting the NAPTR record of IP telephone apparatus 101, ENUM server 103 notifies IP telephone apparatus 102 of a message "Respond indicating the deletion of the NAPTR record of IP telephone apparatus 101", upon receiving the message "Request the NAPTR record of IP telephone apparatus 101" regularly transmitted from IP telephone apparatus 102. Also, IP telephone apparatus 101 notifies IP telephone apparatus 102, which is previously stored in notified destination memory 206 as the call destination, of a message "Notify that the NAPTR record of IP telephone apparatus 101 has been deleted".

Upon receiving the message "Notify that the NAPTR record of IP telephone apparatus 101 has been deleted", IP telephone apparatus 102 turns off display lamp 305 indicating that the user is available in order to notify the user of IP telephone apparatus 102 that the user of IP telephone apparatus 101 is not available.

In the above-described embodiment of the present invention, the NAPTR record of IP telephone apparatus 101 is deleted from ENUM server 103, but it is also applicable likewise to a case where the NAPTR record of IP telephone apparatus 102 is deleted from ENUM server 103. Additionally, in the above-described embodiment of the present invention, the deletion of the NAPTR record of IP telephone apparatus 101 is notified to IP telephone apparatus 102, but it is also applicable likewise that the deletion of the NAPTR record of IP telephone apparatus 102 is notified to IP telephone apparatus 101.

As described above, each of the users of IP telephone apparatus 101 and IP telephone apparatus 102 can delete the NAPTR record from ENUM server 103 simply by pressing a predetermined key, for example, absent key 303. Therefore, the user can be saved the trouble of deleting the NAPTR record and can notify another IP telephone apparatus that the user is not available. Each of the users of IP telephone apparatus 101 and IP telephone apparatus 102 can also confirm that the user of the another IP telephone apparatus is not available by looking at display lamp 305 indicating that the user is available and seeing that it is OFF, and thus can avoid an unnecessary call. As a result, a user-friendly IP telephone system is provided for the user of the IP telephone apparatus.

Additionally, according the above-described embodiment of the present invention, IP telephone apparatus 101 notifies IP telephone apparatus 102 that the NAPTR record of IP telephone apparatus 101 has been deleted using an original message "Notify IP telephone apparatus 101 has been deleted". Then, IP telephone apparatus 102 responds to IP telephone apparatus 101 using an original message "Respond indicating the deletion of IP telephone apparatus 101". However, another message can also be used for this message.

For example, by using a SIP standard message regulated by RFC3261 or a message "Notify Info" regulated by RFC3427, the IP address of IP telephone apparatus 101 can be specified with a non-standard header of the message (for example, "P" header), and another message can be transmitted to IP telephone apparatus 102.

In this case, IP telephone apparatus 102 can refer to the IP address of IP telephone apparatus 101 specified in "P" header included in the message "Notify Info" and can recognize that the NAPTR record of IP telephone apparatus 101 has been deleted. Then, IP telephone apparatus 102 can return, to IP telephone apparatus 101, "P" header of the message "Notify Info", in which the IP address of IP telephone apparatus 102 is specified.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-231154 filed on Aug. 6, 2004 and No. 2005-085871 filed on Mar. 24, 2005 entire content of which is expressly incorporated by reference herein.

What is claimed is:

1. An IP (Internet Protocol) telephone apparatus connected to an ENUM (Telephone Number Mapping) server via a network, the ENUM server storing a NAPTR (Naming Authority Pointer) resource record of the IP telephone apparatus, the NAPTR resource record including a domain name corresponding to a URI (Uniform Resource Identifier), the domain name and the URI being associated with the IP telephone apparatus, the IP telephone apparatus comprising:

a panel that includes a predetermined multi-function key, the predetermined multi-function key, when actuated by a user of the IP telephone apparatus, indicates that the user is unavailable, actuates a call answering function, and initiates an automatic deletion of the NAPTR resource record of the IP telephone apparatus stored in the ENUM server; and a controller configured to transmit, to the ENUM server, a request for deleting the NAPTR resource record of the IP telephone apparatus stored in the ENUM server, in response to the actuation of the predetermined multi-function key, whereby the ENUM server deletes the NAPTR resource record of the IP telephone apparatus from the ENUM server, and whereby, based on the deletion of the NAPTR resource record from the ENUM server, a user of another IP telephone apparatus connected to the network is notified that the user of the IP telephone apparatus is unavailable by a predetermined indicator lamp associated with the user of the IP telephone apparatus, the indicator lamp being located on a panel of the another IP telephone apparatus.

2. The IP telephone apparatus according to claim 1, wherein the another IP telephone apparatus transmits, to the ENUM server, an inquiry for a NAPTR resource record of the IP telephone apparatus, wherein the another IP telephone apparatus receives, from the ENUM server, a reply to the inquiry, and wherein the another IP telephone apparatus notifies the user of the another IP telephone apparatus that a user of the IP telephone apparatus is unavailable, when the reply indicates that the NAPTR resource record of the IP telephone apparatus is not stored in the ENUM server.

3. An IP (Internet Protocol) telephone apparatus connected to another IP telephone apparatus and to an ENUM (Telephone Number Mapping) server via a network, the ENUM server storing a NAPTR (Naming Authority Pointer) resource record of the another IP telephone apparatus, the NAPTR resource record including a domain name corresponding to a URI (Uniform Resource Identifier), the domain name and the URI being associated with the another IP telephone apparatus, the IP telephone apparatus comprising:

a panel configured to indicate when the NAPTR resource record of the another IP telephone apparatus is present in the ENUM server, and configured to indicate when the NAPTR resource record of the another IP telephone apparatus has been deleted from the ENUM server by an actuation of a predetermined multi-function key of the another IP telephone apparatus, the actuation of the predetermined multi-function key also indicating that the user of the another IP telephone apparatus is unavailable and activating a call answering function of the another IP telephone apparatus; and a controller, wherein the controller is configured to transmit, to the ENUM server, an inquiry for a NAPTR resource record of the another IP telephone apparatus, wherein the controller is configured to receive, from the ENUM server, a reply to the inquiry, and wherein the controller is configured to notify, via a predetermined indicator lamp located on the panel that is associated with a user of the another IP telephone apparatus, a user of the IP telephone apparatus that the user of the another IP telephone apparatus is unavailable, when the reply indicates that the NAPTR resource record of the another IP telephone apparatus is not stored in the ENUM server.

4. An ENUM (Telephone Number Mapping) server connected to an IP (Internet Protocol) telephone apparatus, the ENUM server comprising:

a memory configured to store a NAPTR (Naming Authority Pointer) resource record of the IP telephone apparatus, the NAPTR resource record including a domain name corresponding to a URI (Uniform Resource Identifier), the domain name and the URI being associated with the IP telephone apparatus; and a controller, wherein the controller is configured to receive, from the IP telephone apparatus, a user initiated request, indicating that the user is unavailable, for deleting the NAPTR resource record of the IP telephone apparatus stored in the ENUM server, the user initiated request being actuated by a predetermined multi-function key on a panel of the IP telephone apparatus, which also activates a call answering function, and wherein the controller is configured to delete the NAPTR resource record of the IP telephone apparatus stored in the ENUM server in response to the user initiated request, and wherein, based on the deletion of the NAPTR resource record of the IP telephone apparatus, the user of a predetermined IP telephone apparatus is notified that the user of the IP telephone apparatus is unavailable by a predetermined indicator lamp associated with the user of the IP telephone apparatus, the indicator lamp being located on a panel of the predetermined IP telephone apparatus.

5. The ENUM server according to claim 4, wherein the controller transmits, to the predetermined IP telephone apparatus, a notice indicating that the NAPTR resource record of the IP telephone apparatus is deleted from the ENUM server, when the NAPTR resource record of the IP telephone apparatus is deleted from the ENUM server.

6. The ENUM server according to claim 5, wherein the predetermined IP telephone apparatus notifies, via the predetermined indicator lamp, the user of the predetermined IP telephone apparatus that the user of the IP telephone apparatus is unavailable, when the notice indicating that the NAPTR resource record of the IP telephone apparatus is deleted from the ENUM server has been received by the predetermined IP telephone apparatus.

7. An IP (Internet Protocol) telephone system, comprising:

an ENUM (Telephone Number Mapping) server configured to store at least one NAPTR (Naming Authority Pointer) resource record, the at least one NAPTR resource record including a domain name corresponding to a URI (Uniform Resource Identifier); and an IP telephone apparatus configured to transmit, to the ENUM server, a request for deleting a NAPTR resource record of the IP telephone apparatus stored in the ENUM server, upon actuation of a predetermined multi-function key by a user of the IP telephone apparatus indicating that the user is unavailable, and activating a call answering function, wherein the ENUM server receives, from the IP telephone apparatus, the request for deleting the NAPTR resource record of the IP telephone apparatus stored in the ENUM server, wherein the ENUM server deletes the NAPTR resource record of the IP telephone apparatus stored in the ENUM server in response to the request, and wherein, based on the deletion of the NAPTR resource record of the IP telephone apparatus, the user of a predetermined IP telephone apparatus is notified that the user of the IP telephone apparatus is unavailable by a predetermined indicator lamp associated with the user of the IP telephone apparatus, the indicator lamp being located on a panel of the predetermined IP telephone apparatus.

8. The IP (Internet Protocol) telephone system according to claim 7, wherein, when the ENUM server deletes the NAPTR resource record of the IP telephone apparatus, the ENUM server transmits, to the predetermined IP telephone apparatus, a notice indicating that the NAPTR resource record of the IP telephone apparatus is deleted from the ENUM server.

9. A method for deleting a NAPTR (Naming Authority Pointer) resource record of an IP (Internet Protocol) telephone apparatus in an EMUM (Telephone Number Mapping) server, the NAPTR resource record including a domain name corresponding to a URI (Uniform Resource Identifier), the domain name and the URI being associated with the IP telephone apparatus, the IP telephone apparatus including a predetermined multi-function key, the method comprising:

actuating, by a user of the IP telephone apparatus, the predetermined multi-function key to indicate that the user is not available, activate a call answering function, and initiate an automatic deletion of the NAPTR resource record of the IP telephone apparatus in the ENUM server;

determining, by the IP telephone apparatus, that the predetermined multi-function key has been actuated by the user;

transmitting, from the IP telephone apparatus to the ENUM server, a request for deleting the NAPTR resource record of the IP telephone apparatus stored in the ENUM server in response to actuation of the predetermined multi-function key, deleting, by the ENUM server, the NAPTR resource record of the IP telephone apparatus, and notifying a predetermined IP telephone apparatus that the user of the IP telephone apparatus is not available by a predetermined indicator lamp associated with the user of the IP telephone apparatus, the indicator lamp being located on a panel of the predetermined IP telephone apparatus.

* * * * *